3,102,067
VINYL PHOSPHATES
Joseph W. Baker, Kirkwood, Mo., and George A. Saul, Nitro, W. Va., assignors to Monsanto Chemical Company, St. Louis, Mo., a corporation of Delaware
No Drawing. Filed June 20, 1960, Ser. No. 37,067
18 Claims. (Cl. 167—22)

This invention relates to new and useful compounds of phosphorus and to methods of making same. Additionally this invention relates to insecticidal compositions containing the compounds of this invention as an active ingredient.

The compounds of this invention can be termed vinyl phosphates and can be represented by the structure

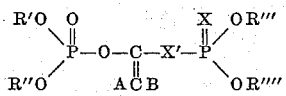

wherein R', R", R''' or R'''' are like or unlike aliphatic radicals, wherein X and X' are chalkogens of atomic weight less than 40 (i.e. sulfur or oxygen), and wherein A and B are hydrogen or lower alkyl or halogen of atomic number from 9 to 35 (i.e. chlorine, bromine or fluorine). As illustrative of aliphatic radicals contemplated are methyl, ethyl, propyl, isopropyl, butyl, isobutyl, sec. butyl, amyl, isoamyl, methoxyethyl, ethoxyethyl, isopropoxyethyl, methoxybutyl, chloroethyl, chloropropyl, chlorobutyl, chloroamyl, etc. In general R', R", R''' and R'''' will contain not more than 5 carbon atoms and it is preferred that they be alkyl radicals, particularly alkyl radicals containing 1 to 2 carbon atoms (i.e. methyl or ethyl).

The vinyl phosphates of this invention can be prepared by reacting a phosphite of the structure

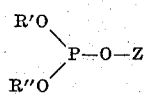

wherein Z is an alkali metal (e.g. sodium, potassium or lithium) or an aliphatic radical such as the aforedescribed with a substantially equimolar amount of a mixed anhydride of a phosphoric acid and an alpha-halo fatty acid of the strutcure

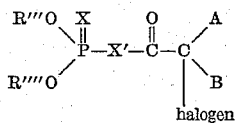

wherein R''', R'''', X, X', A and B have the aforedescribed significance and wherein "halogen" means a halogen having an atomic number from 17 to 35 (i.e. chlorine or bromine). Where and when desired an inert organic solvent (e.g. benzene, toluene, xylene, acetone, butanone, dioxane, etc.) can be employed but in general such is not necessary. While a wide range of reaction temperatures can be employed provided the system is fluid (i.e. the reaction system is maintained above the freezing point of the system up to and including its boiling point), it is preferred to employ a reaction temperature in the range of 10° C. to 150° C. The reaction system may also contain a small amount of a polymerization inhibitor such as hydroquinone.

The aforementioned mixed anhydride reactants are known materials and can be obtained from an alpha-halo fatty acid chloride of the structure

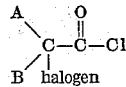

wherein A, B and "halogen" have the aforedescribed significance (e.g. chloroacetyl chloride, bromoacetyl chloride, dichloroacetyl chloride, dibromoacetyl chloride, trichloroacetyl chloride, alphachloropropionyl chloride, alpha-chlorobutyryl chloride, alphachloroisobutyryl chloride, alpha-chlorovaleryl chloride, etc.) and the appropriate phosphate of the structure

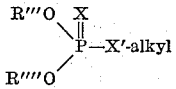

wherein R''', R'''', X and X' have the aforedescribed significance and wherein "alkyl" means methyl or ethyl.

As illustrative of the preparation of the vinyl phosphates of this invention is the following:

Example I

To a suitable reaction vessel equipped with a thermometer, agitator, condenser and dropping funnel is charged 22.0 parts by weight of the mixed anhydride of dimethyl phosphoric acid and chloroacetic acid

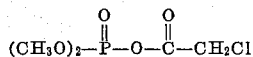

and approximately 0.1 part by weight of hydroquinone. While maintaining the charge at 90–105° C. there is added dropwise over a 35 minute period 13.9 parts by weight of trimethyl phosphite. The mixture is then heated for 3.5 hours at 100° C. and then the temperature is slowly raised to 154° C. and vacuum applied to remove the volatiles. The residue, an amber oil, is 1-(dimethoxyphosphinyloxy)vinyl dimethyl phosphate

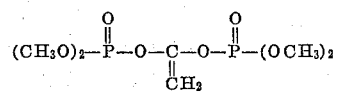

which is soluble in acetone, ethanol, chloroform and benzene but insoluble in water.

Example II

Employing the procedure of Example I but replacing the mixed anhydride reactant with an equimolar amount of the mixed anhydride of dimethyl phosphorothioic acid and chloroacetyl chloride there is obtained 1-(dimethoxyphosphinyloxy)vinyl 0,0-dimethyl phosphorothioate, an amber oil which is soluble in acetone, benzene, toluene, and methanol. Analysis.—Theory: 21.3% P. Found: 21.5% P.

Example III

Employing the procedure of Example I but replacing trimethyl phosphite with an equimolar amount of triethyl phosphite there is obtained 1-(diethoxyphosphinyloxy)-vinyl dimethyl phosphate, a yellow oil which is soluble in ether and ethyl acetate.

Example IV

Employing the procedure of Example I but replacing trimethyl phosphite with an equimolar amount of tri(2-chloroethyl) phosphite there is obtained 1-[bis(2-chloroethoxy)phosphinyloxy] vinyl dimethyl phosphate, which is soluble in benzene and acetone.

Example V

Employing the procedure of Example I but replacing the phosphite reactant and the mixed anhydride reactant respectively with triethyl phosphite and the mixed anhydride of chloroacetic acid and diethyl phosphoric acid there is obtained 1-(diethoxyphosphinyloxy)vinyl diethyl phosphate, an oil which is soluble in acetone, methanol and benzene. Analysis.—Theory: 18.7% P. Found: 18.5% P.

Example VI

Employing the same procedure of Example I but replacing the mixed anhydride reactant with an equimolar amount of the mixed anhydride of dichloroacetic acid and dimethyl phosphoric acid there is obtained 1-(dimethoxyphosphinyloxy)-2-chlorovinyl dimethyl phosphate

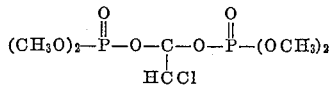

which is soluble in benzene.

*Example VII*

Employing the procedure of Example I but replacing the mixed anhydride reactant with an equimolar amount of the mixed anhydride of trichloroacetic acid and di(2-ethoxyethyl) phosphoric acid there is obtained 1-[bis(2-ethoxyethoxy)phosphinyloxy]-2,2-dichlorovinyl dimethyl phosphate, an oil which is soluble in acetone.

*Example VIII*

Employing the procedure of Example I but replacing the mixed anhydride reactant with an equimolar amount of the mixed anhydride of chloroacetic acid and O,O-diethyl phosphorodithioic acid there is obtained 1-(dimethoxyphosphinyloxy)vinyl O,O-diethyl phosphorodithioate

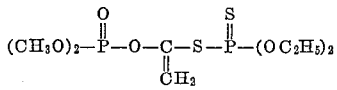

an oil which is soluble in acetone and ether.

*Example IX*

Employing the procedure of Example I but replacing the mixed anhydride reactant with the mixed anhydride of alpha-chloroisobutyric acid and diisopropyl phosphoric acid there is obtained 1-(diisopropoxyphosphinyloxy)-2,2-dimethylvinyl dimethyl phosphate, an oil which is soluble in benzene.

*Example X*

To a suitable reaction vessel equipped with a thermometer, reflux condenser and agitator is charged 22 parts by weight of the mixed anhydride of dimethyl phosphoric acid and bromoacetic acid, 0.1 part by weight of hydroquinone, 75 parts by weight of toluene, and 19.4 parts by weight of potassium diethyl phosphite. The so-charged mass is refluxed for approximately 6 hours, cooled to room temperature and filtered. The filtrate is then subjected to vacuum distillation to remove the volatiles. The residue, a yellow oil, is 1-(diethoxyphosphinyloxy)vinyl dimethyl phosphate, which is soluble in ether and ethyl acetate.

*Example XI*

Employing the procedure of Example X but replacing potassium diethyl phosphite with an equimolar amount of sodium diisobutyl phospite there is obtained 1-(diisobutoxyphosphinyloxy)vinyl dimethyl phosphate which oily material is insoluble in water.

*Example XII*

Employing the procedure of Example X but replacing the mixed anhydride reactant with an equimolar amount of the mixed anhydride of diamyl phosphoric acid and alpha-bromopropionic acid there is obtained 1-(diamyloxyphosphinyloxy)-2-methylvinyl diethyl phosphate which oily material is insoluble in water.

Other phosphite reactants than those specifically set forth above can be employed in preparing the vinyl phosphates of this invention, e.g. tripropyl phosphite, triisopropyl phosphite, methyl dipropyl phosphite, tributyl phosphite, methyl dibutyl phosphite, triisoamyl phosphite, sodium diethyl phosphite, potassium diisopropyl phosphite, potassium di-sec.amyl phosphite, tri(isopropoxyethyl) phosphite, tri(3-chloropropyl) phosphite, sodium di(2-chloroethyl) phosphite, potassium di(2-methoxyethyl) phosphite, potassium di(4-methoxybutyl)phosphite, potassium di(4-chloroamyl) phosphite, etc. Also other mixed anhydride reactants than those specifically set forth above can be employed in preparing the vinyl phosphates of this invention, e.g. the respective mixed anhydrides of Chloroacetic acid and diisopropyl phosphoric acid,
Bromoacetic acid and dimethyl phosphoric acid,
Bromoacetic acid and diethyl phosphoric acid,
Chloroacetic acid and di(2-chloroethyl) phosphoric acid,
Chloroacetic acid and di(2-ethoxyethyl) phosphoric acid,
Bromoacetic acid and diisobutyl phosphoric acid,
Chloroacetic acid and O,O-diethyl phosphorothioic acid,
Bromoacetic acid and O,O-diisopropyl phosphorodithioic acid,
Alpha-chloropropionic acid and O,O-dimethyl phosphorothioic acid,
Alpha-bromoisobutyric acid and dimethyl phoshoric acid,
Alpha-chlorovaleric acid and O,O-diethyl phosphorothioic acid, etc.

It will be understood that the terms "insect" and "insecticide" are used herein in their broad common usage to include spiders, mites, ticks, and like pests which are not in the strict biological sense classed insects. Thus the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged, usually winged forms, as beetles, bugs, bees, flies, and so forth, but also to other allied classes of anthropods whose members are wingless and usually have more than six legs, as spiders, mites, ticks, centipedes, and wood lice.

The vinyl phosphates of this invention are effective against a wide variety of insect pests. As illustrative of the activity but not limitative thereof is the following:

One gram of 1-(dimethoxyphosphinyloxy)vinyl O,O-dimethyl phosphorothioate (the product of Example II) is dissolved in sufficient acetone to make a concentrate solution thereof. Approximately 0.1 cc. of sorbitan monolaurate polyoxyethylene derivative (a commercial water-soluble non-ionic emulsifying agent containing 20 moles of ethylene oxide per mole of sorbitan monolaurate) is then mixed with the concentrate. To this mixture and with agitation is added sufficient water to provide an aqueous emulsion having a concenration of 0.006% by weight of said vinyl phosphate. Thereupon lima bean plant leaves previously infested with the two-spotted spider mite, *Tetranychus telarius* (L.) are dipped in the aqueous emulsion, withdrawn, and set aside for observation. At the end of 48 hours a 100% kill of the mobile stage of the mite is noted. Seven days after setting the test specimen aside, residual activity is confirmed, a 100% kill of both the resting stage and the ova stage being noted. Similar results against the mobile stage of the same mite are obtained by employing the respective vinyl phosphates of Examples III and V at a concentration of 0.1% by weight.

Contact activity at low concentrations is also observed against yellow fever mosquito larvae, *Aëdes aegypti*, employing the vinyl phosphates of this invention.

With respect to the two-spotted spider mite, *Tetranychus telarius* (L.), systemic activity is also displayed by the vinyl phosphates of this invention, e.g. at concentrations of 0.004% by weight 100% kills are observed employing the respective vinyl phosphates of Examples I, II and III. At the same concentrations systemic activity is exhibited by the vinyl phosphates of Examples I and II against cotton aphid adults.

Although the vinyl phosphates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the vinyl phosphates of this invention are dispersed, it means that the particles of the vinyl phosphates of this invention may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the vinyl phosphates of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the vinyl phosphates of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the vinyl phosphates of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions, or aerosols) the concentration of the vinyl phosphate employed to supply the desired dosage generally will be in the range of 0.001 to 50 percent by weight. When the extending agent is a semi-solid or solid, the concentration of the vinyl phosphate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g., powdered clay or talc) or other low-cost material available to the agriculturist at the point of use, he will have an easily prepared insecticidal spray or particulate solid. In such a concentrate composition, the vinyl phosphate generally will be present in a concentration of 5 to 95 percent by weight, the residue being any one or more of the well-known insecticidal adjuvants, such as the various surface active agents (e.g. detergents, a soap or other emulsifying or wetting agent), surface active clays, solvents, diluents, carrier media, adhesives, spreading agents, humectants, and the like.

There are a large number of organic liquids which can be used for the preparation of solutions, suspensions or emulsions of the vinyl phosphates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of the same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the vinyl phosphates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The vinyl phosphates of this invention are preferably supplied to the insect pests or to the environment of the insect pests in the form of emulsions or suspensions. Emulsions or suspensions are prepared by dispersing the vinyl phosphate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear, "Chemistry of Insecticides, Fungicides and Herbicides," second edition page 280). These surfactants include the well-known capillary active substances which may be anion-active (or anionic), cation active (or cationic), or non-ionizing (or non-ionic) which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents," by John W. McCutcheon, and also in the July, August, September and October 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface-active agents and the water-soluble non-ionic surface-active agents set forth in U.S. 2,846,398 (issued August 5, 1958). In general it is preferred that a mixture of water-soluble anionic and water-soluble non-ionic surfactants be employed.

The vinyl phosphates of this invention can be dispersed by suitable methods (e.g. tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays.

For special purposes the vinyl phosphates of this invention can be dispersed in a semi-solid extending agent such as petrolatum or soap (e.g. sodium stearate or oleate or palmitate or mixtures thereof) with or without the aid of solubility promotors and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of vinyl phosphate of this invention with a water-soluble surfactant which lowers the surface tension of water in the weight proportions of 0.1 to 15 parts of surfactant with sufficient of the vinyl phosphate of this invention to make 100 parts by weight. Such a concentrate is particularly adapted to be made into a spray for combatting various forms of insect pests (particularly mites) by the addition of water thereto. As illustrative of such a concentrate is an intimate mixture of 95 parts by weight of 1-(dimethoxyphosphinyloxy)vinyl O,O-dimethyl phosphorothioate (the product of Example II) and 5 parts by weight of a water-soluble non-ionic surfactant such as the polyoxyethylene derivative of sorbitan monolaurate.

Another useful concentrate adapted to be made into a spray for combatting insect pests (particularly mites) is a solution (preferably as concentrated as possible) of a vinyl phosphate of this invention in an organic solvent therefor. The said liquid concentrate preferably contains dissolved therein a minor amount (e.g., 0.5 to 10 percent by weight of the weight of the new insecticidal agent) of a surfactant (or emulsifying agent), which surfactant is also water-soluble. As illustrative of such a concentrate is a solution of 1-(dimethoxyphosphinyloxy) vinyl dimethyl phosphate (the product of Example I) in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester or alkylphenol.

In all of the various dispersions described hereinbefore for insecticidal purposes, the active ingredient can be one or more of the compounds of this invention. The compounds of this invention can also be advantageously employed in combination with other pesticides, including, for example, nematocides, bactericides, and herbicides. In this manner it is possible to obtain mixtures which are effective against a wide variety of pests and other forms of noxious life.

In controlling or combatting insect pests the vinyl phosphates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g., agricultural soil or other growth media or other media infested with the insect pests or attractable to the pests for habitational or sustenance or propagational purposes, in any conventional fashion which permits contact between the insect pests and the vinyl phosphate of this invention. Such dispersing can be brought about by applying sprays or particulate solid compositions to a surface infested with the insect pests or attractable to the pests, as for example, the surface of an agricultural soil or other media such as the above ground surface of plants by any of the conventional methods, e.g. power dusters, boom and hand sprayers and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. Vinyl phosphates of the structure

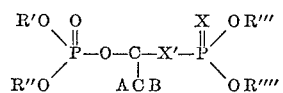

wherein R′, R″, R‴, and R⁗ are aliphatic radicals containing 1 to 5 carbon atoms selected from the group consisting of alkyl, alkoxyalkyl, and chloroalkyl, wherein X and X′ are chalkogens of atomic weight less than 40, and wherein A and B are selected from the group consisting of hydrogen, lower alkyl, and halogen of atomic number from 9 to 35.

2. Vinyl phosphates of the structure

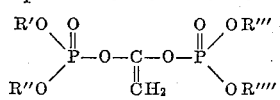

wherein R′, R″, R‴, and R⁗ are alkyl radicals containing from 1 to 2 carbon atoms.

3. 1 - (dimethoxyphosphinyloxy)vinyl dimethyl phosphate.

4. 1-(diethoxyphosphinyloxy)vinyl diethyl phosphate.

5. 1 - (dimethoxyphosphinyloxy)vinyl O,O - dimethyl phosphorothioate.

6. 1 - (dimethoxyphosphinyloxy)vinyl diethyl phosphate.

7. The method of making the vinyl phosphates of claim 1 which comprises reacting a phosphite of the structure

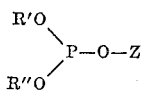

wherein R′ and R″ have the same significance as in claim 1 and wherein Z is selected from the group consisting of alkali metal and aliphatic radicals with a substantially equimolar amount of a mixed anhydride of the structure

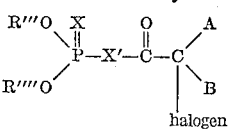

wherein R‴, R⁗, X, X′, A and B have the same significance as in claim 1 and wherein "halogen" means a halogen having an atomic number from 17 to 35.

8. The method of making the vinyl phosphates of claim 2 which comprises reacting a phosphite of the structure

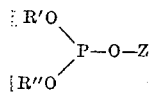

wherein R', R" and Z are alkyl radicals containing from 1 to 2 carbon atoms with a substantially equimolar amount of a mixed anhydride of the structure

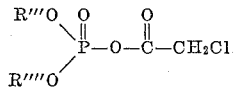

wherein R''' and R'''' are alkyl radicals containing from 1 to 2 carbon atoms.

9. The method for protection of plants against insect attack which comprises applying to the plant an insecticidal amount of at least one compound of claim 1.

10. An insecticidal composition comprising a compound of claim 1 dispersed in an extending agent.

11. An insecticidal composition comprising a compound of claim 1 dispersed in an extending agent, the composition containing 0.1 to 25 percent by weight of said compound of claim 1, the extending agent being selected from the group consisting of solid and semi-solid extending agents.

12. An insecticidal composition comprising a compound of claim 1 dispersed in a liquid extending agent, the composition containing 0.001 to 50 percent by weight of said compound of claim 1.

13. An insecticidal composition comprising a compound of claim 2 dispersed in an adsorbent clay, the composition containing 0.1 to 25 percent by weight of said compound of claim 2.

14. An insecticidal concentrate comprising a compound of claim 2 and an insecticidal adjuvant, said concentrate containing from 5 to 95 percent by weight of the compound of claim 2.

15. An insecticidal concentrate comprising a compound of claim 2 dispersed in an organic solvent therefor and having dissolved therein a minor amount of a surfactant, said concentrate forming an emulsion with water upon agitation therewith.

16. An insecticidal concentrate adapted to be made into a sprayable composition by the addition of water comprising a compound of claim 2 in admixture with a water-soluble surfactant in the weight proportion of 0.1 to 15 parts of surfactant and sufficient of said compound of claim 2 to make 100 parts by weight.

17. The method of controlling insects which comprises contacting the insects with a toxic amount of a compound of claim 1.

18. The method of controlling insects which comprises contacting the insects with a toxic amount of a compound of claim 2.

References Cited in the file of this patent
UNITED STATES PATENTS
2,934,469     Baker et al. _____ Apr. 26, 1960